Oct. 13, 1959 J. O. ELY 2,908,823
PRODUCTION OF MONOENERGETIC NEUTRONS
Filed Feb. 18, 1954 3 Sheets-Sheet 1

JOHN O. ELY
INVENTOR.

BY D. Carl Richards
ATTORNEY

Oct. 13, 1959         J. O. ELY         2,908,823
PRODUCTION OF MONOENERGETIC NEUTRONS
Filed Feb. 18, 1954                3 Sheets-Sheet 2

JOHN O. ELY
INVENTOR.

BY D. Carl Richards
ATTORNEY

United States Patent Office 2,908,823
Patented Oct. 13, 1959

2,908,823
PRODUCTION OF MONOENERGETIC NEUTRONS

John O. Ely, Dallas, Tex., assignor, by mesne assignments, to Socony Mobil Oil Company, Inc., a corporation of New York Application February 18, 1954, Serial No. 411,234

12 Claims. (Cl. 250—84)

The present invention relates to the production of monoenergetic neutrons at locations ordinarily inaccessible particularly as in the process of logging formations adjacent drilling holes. In a more specific aspect, the invention relates to a particular manner of maintaining a nuclear reaction between hydrogen isotopes for neutron production in well bores.

Investigation of the properties of substances through irradiation by neutrons has provided new and useful information in many fields of investigation. In the past, neutrons have been produced through the use of naturally radioactive substances such as a mixture of radium and beryllium or polonium and beryllium. It has since been found that certain reactions associated with the isotopes of hydrogen produce monoenergetic neutrons and that such production is free from unwanted radiations such as the gamma radiation characteristic of the radium-beryllium sources. The production of monoenergetic neutrons is particularly useful in investigations of the character of subsurface earth formations. Such investigations are ordinarily known as well logging. The present invention is directed to the production of monoenergetic neutrons along the length of well bores and the like.

In accordance with the present invention, there is provided a neutron source which comprises two confined zones with a constricted flow connection between them. A first of the zones is provided with a target having near a surface thereof a high concentration of an isotope of hydrogen. Ion accelerating means are provided in the first zone and adjacent the flow connection from the second zone for propelling the ions onto the target. Means are then provided for permitting introduction of an isotope of hydrogen in gas form into the second zone together with means for ionizing the gas in the second zone. There is then provided means in the first zone for reacting with neutral hydrogen to form a stable hydride, thereby to clear hydrogen from the ion path in the first zone leading to the target.

In another aspect there is provided a neutron source in a well logging system which includes an ion reservoir at a relatively high pressure connected with an ion accelerator in a relatively low pressure zone. Extracting means are provided for delivering ions from the reservoir to the accelerator. A target having a high concentration of a hydrogen isotope within the material near the face thereof intercepts and reacts with the ions in the accelerator to produce neutrons which irradiate the adjacent formations. Means are then provided in the low pressure zone for continuously extracting neutral hydrogen therefrom.

In accordance with a further aspect of the invention, there is provided a neutron logging system in which an elongated bore hole exploring unit includes a high voltage power supply in a lower section thereof. The voltage supply comprises a plurality of rectifier sections connected in cascade by means of interstage transformers formed at least in part by an elongated insulating cylinder of ferromagnetic material which encompasses the high voltage components of the power supply. A target having therein a high concentration of an isotope of hydrogen is positioned within the insulating cylinder and connected to the negative terminal of the power supply. A heavy hydrogen ion source and accelerating structure are positioned above the target and connected to the positive terminal of the supply for neutron production at the target.

In a more specific aspect of the invention a reversible means is provided for selectively producing flow of gas in either direction between the two distinct zones of operation.

For a more complete understanding of the invention and for further objects and advantages thereof, reference may now be had to the following description taken in conjunction with the accompanying drawings in which.

Figures 1, 2:
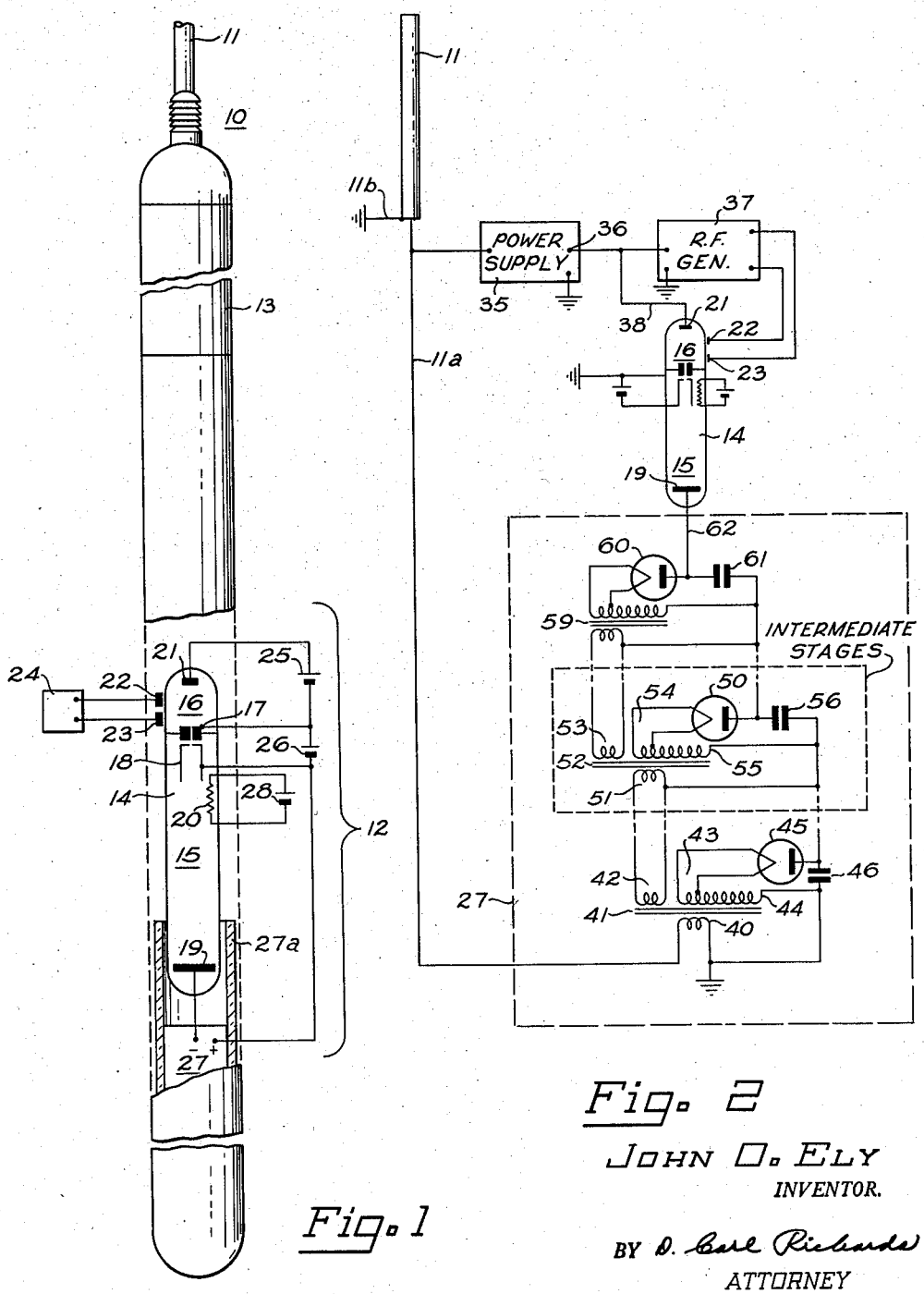
Fig. 1 is a schematic representation of a portion of a well logging system.
Fig. 2 is a circuit diagram of the neutron producing system.

In Fig. 1 portions of a well logging system are illustrated in which an exploring unit 10 is supported for movement along the length of a bore hole as by a cable 11. Cable 11 will include a power circuit and a signal channel whereby power may be delivered to a source section 12 and detected signals may be transmitted to surface indicating or registering means from the receiver section 13. Of particular interest is the system for producing neutrons for irradiating the adjacent earth formations. In accordance with the present invention there is provided a tube 14 having two chambers 15 and 16. The two chambers are interconnected by a restricted flow channel extending through the electrode 17. An ion accelerating and focusing element 18 is positioned immediately adjacent electrode 17. A target 19 is positioned at the end of chamber 15 opposite element 18.

Chamber 15 is provided with a storage means such as a getter 20. Chamber 16 is provided with an anode 21. A pair of electrodes 22 and 23 are positioned outside and adjacent the walls of the enclosure 16.

A tube of the foregoing construction is to be used, in accordance with the present invention, for the production of neutrons by accelerating ions of a hydrogen isotope onto target 19 which has, concentrated within the near surface layers thereof, an accumulation of an isotope of hydrogen. A fraction of the ions produces free neutrons by means of a nuclear reaction with the hydrogen isotope concentrated in the target. Chamber 16 is provided with a source of gas preferably of deuterium. In chamber 16 such gas is ionized by applying a high-intensity R.F. voltage to electrodes 22 and 23 from an R.F. source 24. Anode 21 is maintained positive relative to electrode 17 by battery 25 so that electrons flow to plate 21 and the ions flow to electrode 17. Some ions pass through the constricted flow channel in electrode 17 toward the focusing element 18. Such element is maintained negative relative to electrode 17 by a D.C. source 26. Ions passing through focusing electrode 18 are then accelerated to electrode 19 which is maintained highly negative with respect to element 18 by a voltage source 27. The deuterons thus accelerated react with nuclei of the selected hydrogen isotope in target 19 to produce free neutrons. The hydrogen which thereafter is present in chamber 15 is stored on the getter or filament means 20 which is energized from a voltage source 28.

Thus it will be seen that the system of Fig. 1 includes a reservoir of deuterium ions together with an aperture, a focusing system to form a beam of ions and a target which preferably contains a deposit of tritium. A high voltage supply is provided for accelerating the deuterons onto the tritium target. A collecting means is then provided to maintain the accelerating chamber relatively free from hydrogen ions. The reaction between the deuterium ions and the tritium on target 19 produces neutrons at a uniform level of 14 m.e.v. which then irradiate the adjacent formations. As the bore hole unit 10 is moved through the formations, the resultant radioactive phenomena, either gamma radiation or neutron radiation, may be measured. The gamma radiation or the neutron radiation may be detected and the result transmitted to the earth's surface for registration or study.

The well logging system of Fig. 2 is supplied power from cable 11 which has at least a central conductor and an outer conductive sheath. The latter sheath is connected to ground by connection 11b. The central conductor 11a is connected to a power supply 35 which produces at its output terminal 36 a D.C. voltage which is positive relative to ground. The latter voltage is then applied to an R.F. oscillator and amplifier system 37. The voltage is also connected by way of conductor 38 to the anode 21 in chamber 16. The R.F. voltage from source 37 is then applied to electrodes 22 and 23. Conductor 11a also extends to one terminal of the primary winding 40 of a transformer 41. The second terminal of winding 40 is connected to ground. Transformer 41 essentially has three additional windings. The first is a low voltage secondary winding 42; the second, a filament winding 43; and the third, a high voltage winding 44. In Fig. 2 the filament winding 43 and the high voltage winding 44 are shown as a single winding. A rectifier tube 45 has its cathode connected across the filament winding 43 and its anode conected via capacitor 46 to a grounded end of winding 44 opposite the filament winding. The foregoing elements form the first stage of a high voltage D.C. power supply of the half-wave rectifying type. The intermediate stages are represented by the circuit associated with tube 50. It should be noted that secondary winding 42 is connected to primary winding 51 of transformer 52 which transformer is identical with transformer 41 and has a secondary winding 53, a filament winding 54 and a high voltage winding 55. The anode of tube 45 is connected to the anode of tube 50 by way of a condenser 56. The tube 60 represents the output stage. The anode of tube 60 is connected to the anode of the last tube in the intermediate stages by a condenser 61. There is thus provided a high voltage at the anode of tube 60 which is then applied by way of conductor 62 to the target 19 of tube 14.

It should be understood that to produce neutrons through the reaction between isotopes of hydrogen it is necessary to provide relatively high voltages to suitably accelerate the deuterons as in the system of Fig. 2. Ordinarily this does not present a difficult problem since high voltage generators generally are well known. However the problem of incorporating such a system within the space available in a well logging tool is formidable. Therefore the specific features of the voltage source will be discussed hereinafter in detail as well as features of construction of tube 14.

Figure 3:
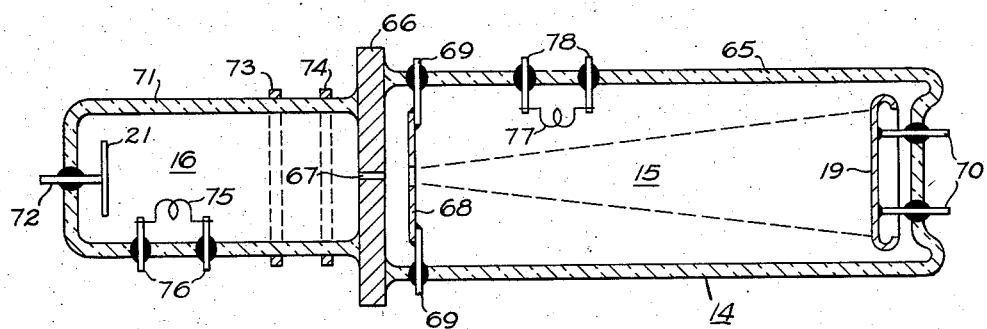
Fig. 3 is a sectional view of a tube utilized in Fig. 1.

Referring now to Fig. 3, there is illustrated a tube which is suitable for carrying out the present invention in one form. Where consistent, like parts will be given the same reference characters as in Figs. 1 and 2. Tube 14 is provided with a first chamber 15. The enclosure for chamber 15 includes a glass tube 65 sealed at one end to a metal disk 66 which is provided with an aperture 67 at the center thereof. A focusing disk 68, having a central aperture coaxial with but larger than aperture 67, is supported near the disk 66 as by suitable rods 69. Rods 69 may also serve as the electrical terminals for the focusing disk 68. The target 19 at the end of tube 65 opposite disk 66 preferably is formed of a plate of metal such as iron, nickel, molybdenum or tungsten. The face of the target is then provided with a thin layer of zirconium or tantalum which has been reacted with tritium to form a hydride which is stable at least within the temperature range encountered in a bore hole. The target is supported by glass-sealed metal terminals 70. The enclosure for the second chamber 16 includes glass tube 71 sealed at one end to the disk 66 opposite tube 65. The anode 21 is supported in the end of tube 71 opposite disk 66 by the glass-sealed terminal 72. A pair of spaced apart metallic rings 73 and 74 encircle tube 71. If plate 21 is maintained negative relative to disk 66 and an R.F. voltage is applied between rings 73 and 74, deuterium introduced into the chamber 16 will be ionized resulting in electron flow to plate 21 and ion flow to the apertured disk 66. The aperture 67 preferably is made small enough that chambers 15 and 16 may be maintained at substantially different pressures with small rates of flow between the two chambers. The ions passing through aperture 67 are focused by electrode 68 and are accelerated by application of a high negative potential to target 19.

In accordance with one form of the present invention, deuterium gas is introduced into chamber 16 by providing filament 75 which serves as a reservoir for deuterium. Preferably the filament at the surface thereof has a concentration of deuterium in metal-hydride form so that heating of the filament by application of a voltage between terminals 76 will decompose the hydride and release the deuterium as a gas in chamber 16. It should be understood that the drawing in this respect is illustrative only and that a more detailed description of a suitable reservoir for deuterium will later be discussed. Similarly, the chamber 15 is provided with a storage filament 77 which will absorb neutral hydrogen in chamber 15 upon the application of a voltage between terminals 78 such as to raise filament 77 to the reaction temperature. It will be apparent that if such storage elements are provided for both chambers, a sealed unit is provided which may be utilized for a period of time in which the filament 75 serves as a source and filament 77 serves as a collector. When filament 75 is exhausted, the process may be reversed to redeposit the deuterium on filament 75. Thus it will be seen that filaments 77 and 75 serve as a reversible means for selectively controlling gas flow through the orifice 67 between the two chambers 15 and 16. It will be appreciated that components of tube 15, Fig. 3, for example filaments 75 and 77 and their supports, have been shown diagrammatically in order to bring out their functional relationship to the other components of the tube. In accordance with design considerations well known by those skilled in the art, the shape of the elements and their locations may be modified to minimize high potential gradients.

While the foregoing description has related to the production of a reaction between deuterium and tritium, it will be appreciated that deuterium on deuterium and tritium on deuterium reactions also may be utilized for the production of neutrons although energy levels and yields in general will be different than those associated with deuterium on tritium.

Figure 4:
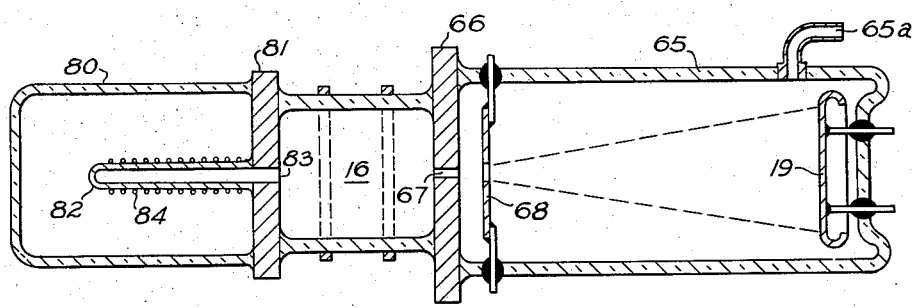
Fig. 4 is a modification of Fig. 3.

In Figs. 1-3 the deuterium reservoir has been described as comprising a filament means. Other reservoir units may be utilized. For example in Fig. 4, where corresponding parts have been given the same reference characters as in Fig. 3, there is provided a bottle 80 which contains deuterium gas at relatively high pressure. The bottle 80 is sealed to an enclosure disk 81. A thimble 82 of palladium is supported by disk 81 and encircles orifice 83. An insulated filament 84 is wound around the palladium thimble 82 to raise the temperature thereof such that the gas 81 may leak into the chamber 16 where the deuterium is ionized for flow into chamber 15. In this case the disk 81 may serve as the anode for chamber 16 to collect electrons after ionization of the deuterium. Application of a potential to render the metallic disk 81 negative with respect to apertured disk 66 will direct ions to the aperture 67. The ions may then be accelerated through the plate 68 onto the anode 19 as in Fig. 3. Neutral hydrogen in enclosure 65 may then be evacuated from the enclosure 65 by means of a vacuum pump connected to the orifice 65a.

Figure 5:
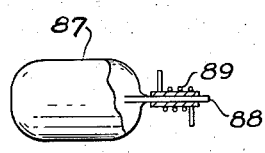
Figs. 5, 6 and 7 illustrate various forms of storing means.
Figure 6:
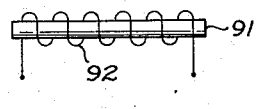
Figure 7:
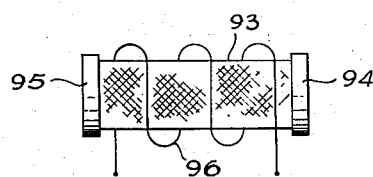

Other suitable reservoirs are shown in Figs. 5–7. For example, in Fig. 5 an irreversible source is shown comprising pressure container 87 having a palladium thimble 88 which, when heated by filament 89, passes deuterium. In Fig. 6 there is illustrated a bar 91 of metal such as zirconium or tantalum which is provided with substantial surface area. Deuterides are formed when bar 91 is heated by filament 92 for reaction with deuterium gas. Thereafter when the filament is heated deuterium may be released and the bar 91 therefore may serve as a suitably controlled source of deuterium.

In Fig. 7, powdered metal suitable for such reaction is supported in a mesh cylinder 93 having end members 94 and 95. Cylinder 93 may be heated by filament 96 to release deuterium which has been reacted with the metal in the mesh cylinder 93. The foregoing illustrate various forms of reservoirs, some being reversible and another irreversible but any one of which may be utilized in accordance with certain aspects of the present invention.

Ionization of the gas in chamber 16 as above described has been carried out utilizing an R.F. field. A glow discharge tube, such as is well known in the art, may also be used as may a hot-cathode electron source with an accelerating chamber. The focusing and accelerating gun of Figs. 3 and 4, such as the disk 68, may be more complex but in any event provides means for focusing the ion stream onto the target 19. The target 19 may be coated with any metal which may form a stable hydride in the temperature range of from 150° to 250° centigrade which hydride can be decomposed slowly somewhere below 2,000° centigrade. The target layer should be reacted as to combine with all the tritium possible to assure a high neutron yield.

Figure 8:
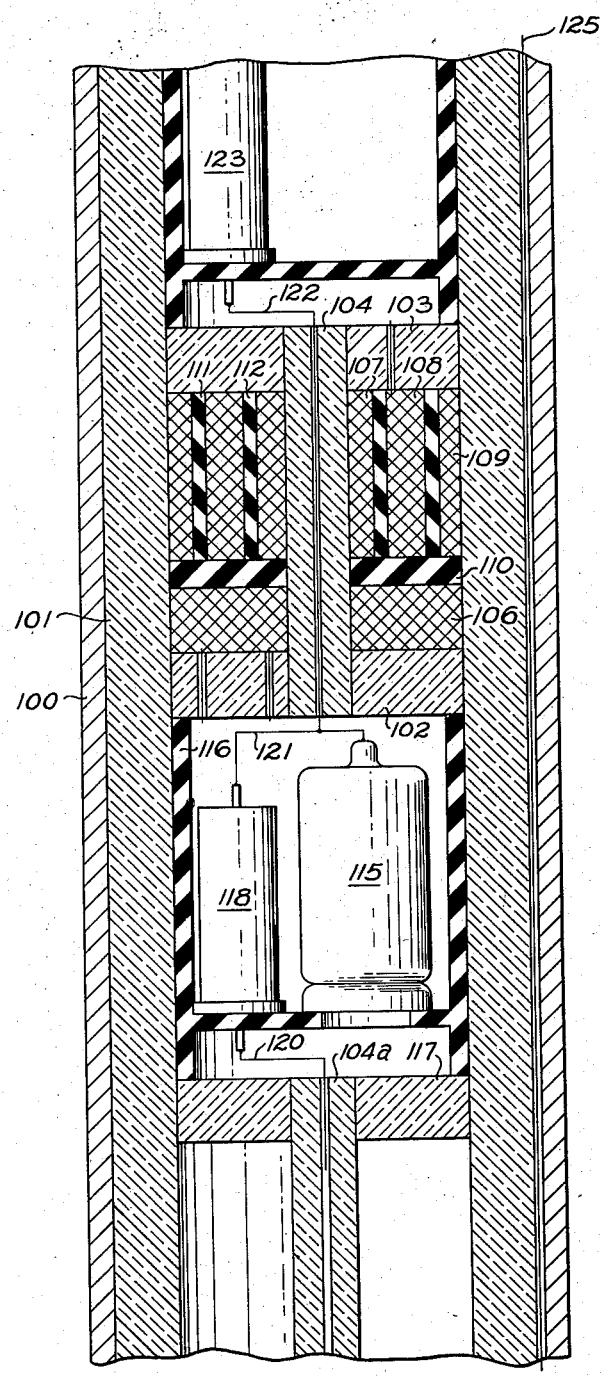
Fig. 8 is a sectional view of the power supply section of Fig. 1.

The system of Fig. 1 partially detailed in Fig. 8 may be utilized to provide the high voltage supply. The principal problem is to properly insulate the voltage source to prevent internal arcing. In accordance with the present invention, the power supply unit is housed within a chamber having rigid steel walls 100. A second cylinder 101 preferably forms a portion of the magnetic flux path for each of the transformers 41, 52 and 59 of Fig. 2. Further, cylinder 101 preferably also exhibits the property of an electrical insulator and therefore will be formed of a ceramic such as presently known in the art as a ferromagnetic spinel. As shown in Fig. 1, the insulating cylinder preferably extends substantially above the target 19. The cylinder is identified by the reference character "27a" and is interposed between the walls of housing 13 and the high voltage source 27. The power supply unit may thus be inserted completely inside such a ferromagnetic tube. The successive rectifier sections may then be built up by providing transformers, one of which is shown completely in Fig. 8. The transformer includes a lower disk 102 and an upper disk 103. The disks are adapted to fit snugly inside tube 101. Each of tubes 102 and 103 is coupled together by a central core spindle 104. When such structure is inserted inside cylinder 100, magnetic flux paths are then completed for any coils placed about the central spindle 104. The transformer windings are then placed on spindle 104. For example, the primary winding, such as winding 40, Fig. 2, is represented by a crosshatched section 106. The winding corresponding to winding 42, Fig. 2, occupies the annulus immediately surrounding the spindle 104 and is represented by the crosshatched section 107. The high voltage winding, such as winding 44, Fig. 2, occupies the central section and is represented by the crosshatched section 108. The cathode winding, such as winding 43, Fig. 2, occupies the outer position and is represented by the crosshatched section 109. An insulating disk 110 separates the primary winding represented by section 106 from windings represented by sections 107, 108 and 109. Insulating cylinders 111 and 112 separate the secondary winding section 107, the high voltage winding section 108 and the filament winding section 109. The rectifier tube 115 may be supported on an insulating structure 116 which may be suitably secured to the disk 102 and to a lower disk 117. The insulating structure 116 also carries the condenser 118. It will be noted that the interstage coupling provided by condenser 118 is formed by passing a conductor 120 connected to the lower terminal of condenser 118 through a central aperture in spindle 104a. The upper terminal of condenser 118 is connected by way of conductor 121 to the anode of tube 115 and by way of conductor 122 to the terminal of the condenser 123 in the next succeeding section. The supply conductor, such as conductor 125, corresponding to conductor 11a of Fig. 2, is threaded through a channel milled in the inner surface of the cylinder 100 and is thus insulated from the high voltage section at the upper end of the power supply by ferromagnetic tube 101. By such construction a high voltage system capable of operating at several hundred thousand volts may be provided within the confines of a logging tool for application of high potentials to the ion accelerating system shown in Figs. 1–4.

While such a system is particularly adapted to providing necessary potentials for carrying out the present invention, it will be understood that other systems may be utilized for producing potentials suitable to operate the tube shown in Figs. 1–4. For example, the Van de Graff generator illustrated and described in co-pending application Serial No. 383,209, filed September 30, 1953, of Tom W. Bonner and Richard L. Caldwell, co-workers of applicant, may also be utilized in accordance with certain aspects of this invention to provide the necessary potential.

It will now be seen that there is provided a neutron well logging system which comprises an exploring unit having an ion reservoir at relatively high pressure and an ion accelerator in a relatively low pressure zone. Means are provided for extracting the ions from the high pressure zone and delivering them to the accelerator. A target is then provided in the low pressure zone with a hydrogen isotope concentrated at and near the face thereof for intercepting and reacting with the accelerated ions to produce neutrons. There is then provided a means for continuously extracting neutral hydrogen from the low pressure zone to permit maintenance of efficient production of neutrons.

Although preferred embodiments of the invention have been disclosed in such detail as to enable a person skilled in the art to make, and use the same, it is to be understood that further modifications may now suggest themselves and it is intended to cover such modifications as fall within the scope of the appended claims.

What is claimed is:

1. In a neutron well logging system the combination which comprises two confined zones, means for introducing an isotope of hydrogen in at least one of said zones, a material in each of said zones capable of reacting with said isotope to form a thermally decomposable hydride, means adapted to heat said material in one of said zones to a first temperature to decompose said hydride and to heat the material in the other of said zones to a second temperature for collecting the resultant gas by formation of a hydride, a target in a first of said zones characterized by a concentrated deposit of an isotope of hydrogen, means for ionizing the gas in a second of said zones, a constricted flow connection between said zones, and accelerating means in said first zone and adjacent said connection for propelling ions of said gas onto said target.

2. In a neutron well logging system the combination which comprises two confined zones, similar storage means in each of said zones, one of said storage means adapted to contain a substantial quantity of an isotope of hydrogen as a stable hydride at a first temperature, which hydride decomposes at a second temperature, means adapted to heat said storage means to said second temperature to decompose said hydride and produce gas in said first zone, means for ionizing said gas, a target in a second of said zones characterized by a deposit of an isotope of hydrogen, a constricted flow connection between said zones as to permit the existence of different pressures therein, and accelerating means in said second zone and adjacent said connection for propelling ions from said first zone on to said target.

3. In a neutron well logging system the combination which comprises an envelope encompassing two confined zones, a constricted flow connection between said zones as to permit the existence of different pressures therein, a target in a first of said zones having a near-surface deposit of an isotope of hydrogen, ion accelerating means in said first zone and adjacent said connection for propelling ions adjacent said connection to said target, means for permitting introduction of an isotope of hydrogen in gas form into one of said zones, means for ionizing said gas in a second of said zones, and getter means in each of said zones for selectively controlling the flow of said gas between said zones.

4. In a neutron well logging system the combination which comprises an ion reservoir, a confined zone adjacent said reservoir, a constricted flow connection between said reservoir and said zone, a target in said zone having near the surface thereof a concentration of an isotope of hydrogen, means for extracting ions from said reservoir through said connection, ion accelerating means in said zone adjacent said connection for propelling said ions to said target, and getter means in said zone for reacting with neutral hydrogen for the formation of a stable hydride thereby to clear hydrogen from the ion path to said target.

5. In a neutron logging system the combination which comprises an elongated bore hole exploring unit having in a first section an ion reservoir at a relatively high pressure, and an ion accelerator in a zone of low pressure together with extracting means for delivering ions from said reservoir to said zone, a target in said zone having a hydrogen isotope concentrated on and near the face thereof, a power supply positioned on the side of said zone opposite said reservoir and adjacent said target and including a plurality of rectifier stages connected in cascade having a negative output terminal connected to said target and having a positive output terminal connected to a point intermediate said zone and said reservoir for accelerating said ions onto said target to produce neutrons which irradiate the adjacent formations, and means for extracting neutral hydrogen from said low pressure zone.

6. In a neutron logging system the combination which comprises an elongated bore hole exploring unit including in a lower section thereof a high voltage power supply characterized by a plurality of rectifier sections connected in cascade with interstage transformers thereof formed at least in part by an elongated insulating cylinder of ferromagnetic material, a heavy hydrogen ion accelerating structure including a heavy hydrogen ion source and a target in said unit above said supply with said target connected to the negative terminal of said supply and a conductor connected to the positive terminal of said supply extending along the outside of said insulating cylinder to said source, and a concentration of an isotope of hydrogen at and near the surface of said target for reacting with accelerated ions to produce monoenergetic neutrons to irradiate formations adjacent said well bore.

7. In a neutron logging system the combination which comprises an elongated exploring unit supported for movement along a well bore including in a lower section thereof a high voltage power supply characterized by a plurality of rectifier sections connected in cascade with interstage transformers thereof formed at least in part by an elongated insulating cylinder of ferromagnetic material, ion accelerating structure including a target within said cylinder and a heavy hydrogen ion source above said cylinder, a connection between the negative terminal of said supply and said target, a conductor connected to the positive terminal of said supply and extending along the outside of said insulating cylinder past said target to said source, and a concentration of an isotope of hydrogen at and near the surface of said target for reacting with accelerated ions to produce monoenergetic neutrons which irradiate formations adjacent said well bore.

8. In a neutron logging system the combination which comprises an elongated exploring unit supported for movement in a well bore and including in a lower section thereof a power supply having a plurality of cascaded rectifier stages in which the interstage transformers are formed at least in part by an elongated insulating cylinder of ferromagnetic material enclosing all other parts of said supply, an ion accelerating structure including a hydrogen isotope target within said cylinder and a heavy-hydrogen ion source above said cylinder, a connection between the negative terminal of said supply and said target, a conductor connected to the positive terminal of said supply and extending along the outside of said insulating cylinder past said target to said source, and a concentration of an isotope of hydrogen at and near the surface of said target for reacting with accelerated ions to produce monoenergetic neutrons which irradiate formations adjacent said bore hole.

9. In a well logging system a high voltage power supply which comprises a rectifier system including a plurality of rectifier stages connected in cascade through coupling transformers, an elongated insulating cylinder of ferromagnetic material enclosing said stages and forming at least in part portions of the magnetic flux paths of said interstage transformers, a pressure resistant housing enclosing said cylinder, and a supply circuit extending from the earth's surface and passing between said cylinders to the low voltage end of said rectifier system.

10. In a neutron logging system the combination which comprises an elongated housing, an ion reservoir at relatively high pressure in a section of said housing spaced from the bottom thereof, an ion accelerator in a relatively low pressure zone, extracting means for delivering hydrogen isotope ions from said reservoir to said accelerator, a target having a hydrogen isotope concentrated on or near the face thereof, a high voltage source connected between said accelerator and said target and positioned in a lower section of said housing for accelerating ions to said target for production of neutrons which irradiate adjacent formations, an insulator in said lower section interposed between said high voltage source and said target, and a current supply path connected to said voltage source and extending from said upper zone through said housing with said insulator interposed between said target and source and said conductor.

11. In a neutron logging system the combination which comprises an elongated housing, an ion reservoir at relatively high pressure in a section of said housing spaced from the bottom thereof, an ion accelerator in a relatively low pressure zone, extracting means for delivering hydrogen isotope ions from said reservoir to said accelerator, a target having a hydrogen isotope concentrated on or near the face thereof, a high voltage source connected between said accelerator and said target and positioned in a lower section of said housing for accelerating ions to said target for production of neutrons which irradiate adjacent formations, an insulator in said lower section encompassing said high voltage source and said target, and a current supply path connected to said voltage source and extending through said housing outside said insulator to an upper zone in said unit.

12. In a system for bombarding formations adjacent a borehole with high energy neutrons the combination which comprises an exploring housing, an ion reservoir at a relatively high pressure in a section spaced from the bottom of said housing, an ion accelerator in a relatively low pressure zone, extracting means for delivering hydrogen isotope ions from said reservoir to said accelerator, a target having a hydrogen isotope concentrated on or near the face thereof for production of neutrons which irradiate adjacent formations, a high voltage source connected between said accelerator and said target and positioned in a lower section of said housing, an insulating shield encompassing said high voltage source and said target, a current supply path connected to said voltage source extending through said housing outside said insulating shield to an upper zone in said unit, and means for continuously reacting neutral hydrogen in said low pressure zone to form a stable hydride.

References Cited in the file of this patent

UNITED STATES PATENTS

| | | |
|---|---|---|
| 2,240,914 | Schutze | May 6, 1941 |
| 2,275,748 | Fearon | Mar. 10, 1942 |
| 2,489,436 | Salisbury | Nov. 29, 1949 |
| 2,541,341 | Crumrine | Feb. 13, 1951 |
| 2,576,600 | Hanson | Nov. 27, 1951 |
| 2,712,081 | Fearon et al. | June 28, 1955 |
| 2,735,019 | Dewan et al. | Feb. 14, 1956 |